W. H. & T. DULANEY.
BUTTER-CARRIER.
No. 192,420. Patented June 26, 1877.
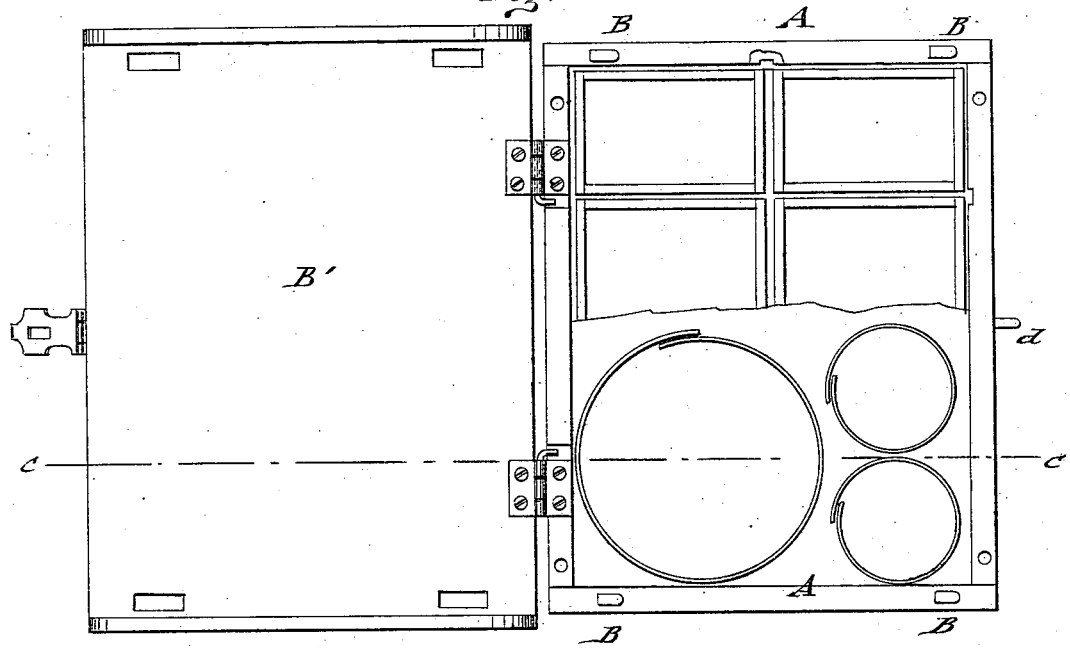
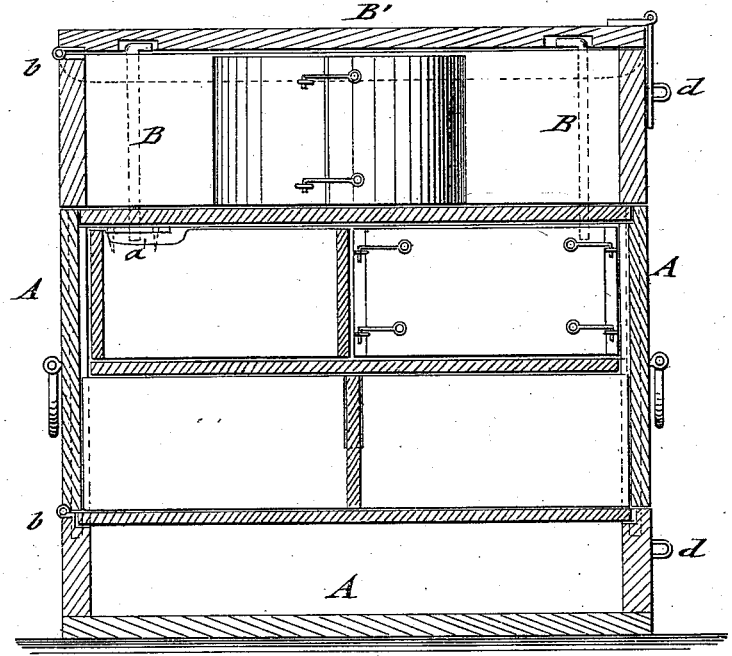

UNITED STATES PATENT OFFICE.

WILLIAM H. DULANEY AND THEOPHILUS DULANEY, OF PETERSTOWN, WEST VIRGINIA.

IMPROVEMENT IN BUTTER-CARRIERS.

Specification forming part of Letters Patent No. 192,420, dated June 26, 1877; application filed April 23, 1877.

*To all whom it may concern:*

Be it known that we, WILLIAM H. DULANEY and THEOPHILUS DULANEY, of Peterstown, in the county of Monroe and State of West Virginia, have invented a new and Improved Butter-Carrier, of which the following is a specification:

In the accompanying drawing, Figure 1 represents a top view of our improved butter-carrier shown with lid open; and Fig. 2 is a vertical transverse section of the same on line *c c*, Fig. 1.

Similar letters of reference indicate corresponding parts.

The object of our invention is to provide, for the purpose of shipping butter in marketable shape, an improved case or carrier, that may be readily arranged for packing a larger or smaller quantity of butter, as required, and the same conveniently taken out and sold from the carrier.

The invention consists of a carrier made of several sections or tiers, with hinged lid, that may be applied to any section to form a larger or smaller case, the sections being connected by fastening-bolts passing through holes of the walls and screwing into the section below.

In the drawing, A represents our improved butter case or carrier, which is made of several sections, that are placed one on the top of the other, and connected by screw-bolts B, that pass through holes in the walls of the section, and screw into threaded plates and sockets *a* at the top of the section next below. The top ends of the connecting-bolts B are bent over, so as to form a head or handle for putting in and removing the bolts. The lid B' is recessed at the under side to provide for the heads of the bolts.

The carrier is preferably made of other sections, of which the middle is about twice the height of the bottom part, and attached first by bolts B, the top section being then placed thereon and fastened by its bolts. The hinged lid B' may be removed by withdrawing the pintle-rods, and attached to the corresponding hinge-portions *b* of the lower part by inserting the same, so that the lower section can be used alone if a small quantity of butter has to be shipped, the front of the bottom section being provided, like the top section, with a staple, *d*, for locking the lid.

By connecting the top and bottom sections the double quantity, and by interposing the middle section the fourfold quantity, of butter may be shipped. The horizontal partitions between the sections are detachable, and set into recesses or seats of the section below.

The butter is formed and packed in wooden shapes of different sizes, being either round or oblong, and connected by hooks and eyes at the ends, as shown in Fig. 2; or the sections or box may be divided into partitions to separate the butter, as desired. The butter is made up in shapes of certain weight, so as to be sold directly without weighing. When the butter in the top section is taken out the top section is removed, and so on until all the butter is taken out of the box, when the sections are reconnected and the carrier returned.

Having thus described our invention, we claim as new and desire to secure by Letters Patent—

A butter-carrier made of several detachable boxes or sections, placed on the top of each other, and being connected by screw-bolts, the lower section or sections having hinge-portions and fastening devices for applying the lid, and forming a carrier of any required size, substantially in the manner and for the purpose specified.

W. H. DULANEY.
THEO. DULANEY.

Witnesses:
KENDLY SHUMATE,
THO. E. CHAMBER.